Patented Jan. 6, 1948

2,433,939

UNITED STATES PATENT OFFICE 2,433,939

FLUORESCENT-DYED CELLULOSE ACETATE FABRIC

George C. Ward and Victor S. Salvin, Cumberland, Md., assignors to Celanese Corporation of America, a corporation of Delaware No Drawing. Application November 4, 1942, Serial No. 464,514

1 Claim. (Cl. 8—57)

This invention relates to the preparation of dyestuffs, and relates more particularly to the preparation of dyestuffs exhibiting fluorescent properties and to the coloration with said dyestuffs of materials made of or containing cellulose acetate or other organic derivative of cellulose.

Some dyestuffs, like various other chemical compounds, exhibit fluorescence when exposed to light. This property of fluorescence is evidenced in some of these dyestuffs and other chemical compounds when they are exposed to ordinary daylight, while others require the excitation of a light source containing a fairly high proportion of violet or ultra-violet light in order to exhibit fluorescence. This property of fluorescence in dyestuffs is often desirable, particularly where the dyestuffs are employed in the coloration of fabrics to produce novel effects therein under the action of light of different wave lengths. Currently, dyestuffs having the property of fluorescence may be employed in various military, civilian and industrial applications. Complete blackouts of industrial plants may be observed faithfully with a greatly increased measure of safety by equipping pedestrians and/or vehicles outside said plants with a device or article of clothing having a small amount of a fluorescent dyestuff applied thereto or painting selected portions of the roadways with a paint having such fluorescent dyestuff as a component. By directing ultraviolet light over the area, which light is, of course, invisible to the human eye the materials containing the fluorescent dyestuff glow sufficiently to be observed. Such fluorescent dyestuffs may likewise be applied in the form of a paint to military equipment such as tanks, planes, trucks and the like or to articles of clothing of the troops in a predetermined pattern or code and by projecting ultra-violet light out over a given area, identification under blackout conditions is greatly simplified. However, many of the dyestuffs exhibiting fluorescence are unsatisfactory especially for dyeing purposes, due to the fact that they are lacking in fastness when the dyed materials are washed or exposed to light.

It is therefore an important object of our invention to provide dyestuffs which exhibit fluorescence when subjected to the action of ultra-violet light and which possesss greatly increased fastness properties.

Another object of our invention is the provision of a novel process for the production of said dyestuffs.

Yet another object of our invention is the coloration of textile materials with said dyestuffs by a method which comprises producing said dyestuffs on the textile materials.

Still another object of our invention is the production of cellulose acetate or other organic derivative of cellulose textile materials colored with said dyestuffs so that said materials will fluoresce under ultra-violet light.

Other objects of our invention will appear from the following detailed description.

We have now discovered that fluorescent dyes which exhibit excellent fastness characteristics may be prepared by subjecting azo dyes having one or more nitro groups ortho to the azo linkage to reduction with a reducing agent comprising a sulfoxylate formaldehyde. The dyestuffs which are obtained by our novel process are fast to light and to washing and are suitable not only for the dyeing of textile materials such as silk, wool, and the like, but they may be satisfactorily employed for dyeing textile materials having a basis of cellulose acetate or other organic derivative of cellulose. Examples of other organic derivatives of cellulose are cellulose esters, such as cellulose propionate, cellulose butyrate, mixed esters, such as cellulose acetate-propionate and cellulose acetate-butyrate and cellulose ethers such as ethyl cellulose and benzyl cellulose.

The fluorescent dyes of our invention may be produced in numerous ways. The dyes may be prepared in substance by reducing ortho-nitro azo dyes in solution with a sulfoxylate formaldehyde. The resulting reduction products are the fluorescent dyestuffs of our invention. The dyes thus obtained may be applied to textile materials such as yarns, fabrics and the like and the dyed textile materials exhibit fluorescent properties. When producing the fluorescent dyes in substance, it is preferable that the aqueous solution in which reduction takes place contain an organic solvent for the azo dyestuff undergoing reduction. Organic solvents such as ethyl alcohol, dioxane, butyl alcohol, etc. may be employed.

The fluorescent dyestuffs may also be produced in situ on the textile material. This may be done advantageously by dyeing a textile material with an ortho-nitro azo dyestuff and subjecting the dyed textile material to the reducing action of a sulfoxylate formaldehyde. The reduction may be carried out by immersing the azo dyed textile material in an aqueous solution of the sulfoxylate formaldehyde. The azo-dyed textile material is subjected to the action of the sulfoxylate formaldehyde solution, which is preferably at an elevated temperature, until the desired reduction takes place and the material is then removed from solution and dried. The reduction of the azo dyestuff on the fabric may likewise be carried out by padding the azo-dyed textile material with an aqueous solution of the sulfoxylate formaldehyde, preferably containing a swelling agent for the textile material, drying the textile material, and then steaming it until the desired reduction is achieved. The textile material obtained is then dried and the dyed material containing the reduced azo dye exhibits the desired fluorescent properties.

Any azo dyestuff having a nitro group ortho to the azo linkage may be reduced in accordance with our novel process and fluorescent dyestuffs may be produced. It is believed that the action of the reducing agent results in the formation of a heterocyclic ring structure of which the nitrogen atom of the reduced ortho nitro group is a part. This, however, is only a theoretical view of the mechanism of the reaction and we do not wish to be bound thereby.

The sulfoxylate formaldehyde which may be employed in reducing said azo dyes may be any suitable sulfoxylate formaldehyde which is alkaline in reaction. Examples of such sulfoxylate formaldehydes are sodium sulfoxylate formaldehyde, potassium sulfoxylate formaldehyde and ammonium sulfoxylate formaldehyde. The sulfoxylate formaldehydes may be employed in solution in concentrations of from ½ to 15% by weight. Preferably, when preparing the dyestuffs in substance the sulfoxylate formaldehyde solution employed is one which contains from 10 to 15% by weight of the sulfoxylate formaldehyde. When the fluorescent dyestuff is prepared in situ on the textile material, we preferably employ solutions containing from ½ to 10% by weight of the sulfoxylate formaldehyde for the reduction.

In carrying out the reduction, the reaction conditions may be varied. The reduction should, of course, not be carried out so far or under such drastic conditions as to destroy the dyestuff entirely by splitting it at the azo grouping. Thus, when the fluorescent dyes are being prepared in substance by reducing an azo dye in an aqueous solution of sulfoxylate formaldehyde containing an organic solvent for the azo dye, the reduction may usually be completed satisfactorily in from one to three hours while the temperature is maintained at from 50 to 80° C.

When the fluorescent dyes are prepared in situ on the textile material by subjecting an azo-dyed textile material to the reducing action of a heated aqueous solution of the sulfoxylate formaldehyde, the ortho-nitro azo dye may be reduced to the desired fluorescent dye by maintaining the azo-dyed textile material in the solution for from ½ to 4 hours while maintaining the solution at a temperature of from 60 to 90° C. Where the fluorescent dye is produced on the textile material by impregnating an azo dyed material with an aqueous solution of a sulfoxylate formaldehyde, drying the textile material and steaming it, the steam may be at a temperature of from 95 to 120° C. and the period of time during which the azo-dyed material is exposed to the steam may be from 5 to 40 minutes.

In order further to illustrate our invention, but without being limited thereto, the following examples are given:

*Example I*

2 parts by weight of 6-chlor-2:4-dinitro-benzene-azo-2'-acetylamino - 4' - di - hydroxyethyl-aniline are dissolved in 50 parts by weight of a solution comprising 35 parts by weight of ethyl alcohol and 15 parts by weight of water. The resulting solution is refluxed with 6 parts by weight of sodium sulfoxylate formaldehyde for 3 hours. The reduced dyestuff obtained by this reaction is employed for dyeing a cellulose acetate fabric. The dyeing obtained is yellow in color but under the action of a light source rich in the ultra-violet band of the spectrum, the dyed fabric fluoresces with a blue-green color. The fluorescent dye exhibiting excellent washing fastness.

*Example II*

The azo dyestuff comprising 4-chlor-2-nitro-benzene-azo-2'-acetylamino-4'-di-hydroxyethyl-aniline is reduced with sodium sulfoxylate formaldehyde as described in Example I. The reduced dyestuff yields a yellow color on cellulose acetate which fluoresces in a blue-green shade under ultra-violet light.

*Example III*

The azo dyestuff comprising 2-nitro-benzene-azo-2'-acetylamino-4'-di-hydroxyethyl-aniline is reduced with sodium sulfoxylate formaldehyde as described in Example I. The reduced dyestuff obtained upon reduction of said azo dye dyes cellulose acetate a yellow color which fluoresces in a blue-green shade under ultra-violet light.

*Example IV*

A cellulose acetate fabric is dyed a red color with 2% of 2:4-dinitro-benzene-azo-diethyl-aniline. The dyed fabric is entered into a heated solution comprising 5 parts by weight of sodium sulfoxylate formaldehyde in 95 parts by weight of water. The solution is heated to 80° C. and the dyed fabric maintained therein for 4 hours. The red shade of the fabric is changed to a yellow shade by this reduction process. Under ultra-violet light the dyed fabric fluoresces in a blue-green color.

It is to be understood that the foregoing detailed description is given merely by way of illustration and that many variations may be made therein without departing from the spirit of our invention.

Having described our invention, what we desire to secure by Letters Patent is:

Cellulose acetate fabrics colored with dyestuffs which fluoresce under the excitation of ultra-violet light and which are fast to washing, said dyestuffs comprising the reduction product of 6-chlor-2:4-dinitro - benzene-azo-2'-acetylamino - 4'-di-hydroxyethyl-aniline with a sulfoxylate formaldehyde of alkaline reaction.

GEORGE C. WARD.
VICTOR S. SALVIN.

REFERENCES CITED

The following references are of record in the file of this patent:

UNITED STATES PATENTS

| Number | Name | Date |
|---|---|---|
| 1,651,639 | Smith | Dec. 6, 1927 |
| 1,885,591 | Coulthard | Nov. 1, 1932 |
| 1,981,907 | Downing | Nov. 27, 1934 |
| 2,083,308 | Senn | June 8, 1937 |
| 2,089,413 | Paine | Aug. 10, 1937 |
| 2,333,204 | Seymour | Nov. 2, 1943 |
| 2,333,329 | Miglarese | Nov. 2, 1943 |
| 2,334,348 | Miglarese | Nov. 16, 1943 |
| 2,362,988 | Conzetti | Nov. 21, 1944 |

FOREIGN PATENTS

| Number | Country | Date |
|---|---|---|
| 29,224 | Great Britain | 1913 |
| 352,099 | Great Britain | July 9, 1931 |
| 390,223 | France | July 23, 1908 |
| 404,840 | Great Britain | Jan. 25, 1934 |

OTHER REFERENCES

Beilstein's Handbuch Organische Chemie, 4th ed., vol. 26, pp. 39, 40, 41; vol. 16, pp. 106, 107, 246. (Copy in Div. 6).